United States Patent [19]

Matthis

[11] Patent Number: 5,236,371
[45] Date of Patent: Aug. 17, 1993

[54] WALL-MOUNTED ELECTRICAL POWER SUPPLY

[76] Inventor: Jack D. Matthis, 9395 Palo Alto, Rancho Cucamonga, Calif. 91730

[21] Appl. No.: 965,858

[22] Filed: Oct. 23, 1992

[51] Int. Cl.⁵ ............................................ H01R 13/72
[52] U.S. Cl. .................................... 439/501; 439/530
[58] Field of Search ............................ 439/527–529, 439/501, 33, 505, 530; 242/107; 191/12.4

[56] References Cited

U.S. PATENT DOCUMENTS 3,815,078 6/1974 Fredrick .................... 191/12.4 X

FOREIGN PATENT DOCUMENTS 1217563 5/1960 France .......................... 191/12.4

Primary Examiner—Eugene F. Desmond
Attorney, Agent, or Firm—Boniard I. Brown

[57] ABSTRACT

An electrical power supply device includes a housing having at least one set of electrical prongs engageable in a wall electrical outlet to detachably mount the housing on a wall. The prongs are electrically connected to an electrical receptacle and an extension cord wound on a rotary reel in the housing. An electrical appliance may be plugged into the receptacle. The extension cord may be pulled from the housing to connect with a second appliance disposed remotely of the housing.

8 Claims, 4 Drawing Sheets

U.S. Patent     Aug. 17, 1993     Sheet 1 of 4     5,236,371
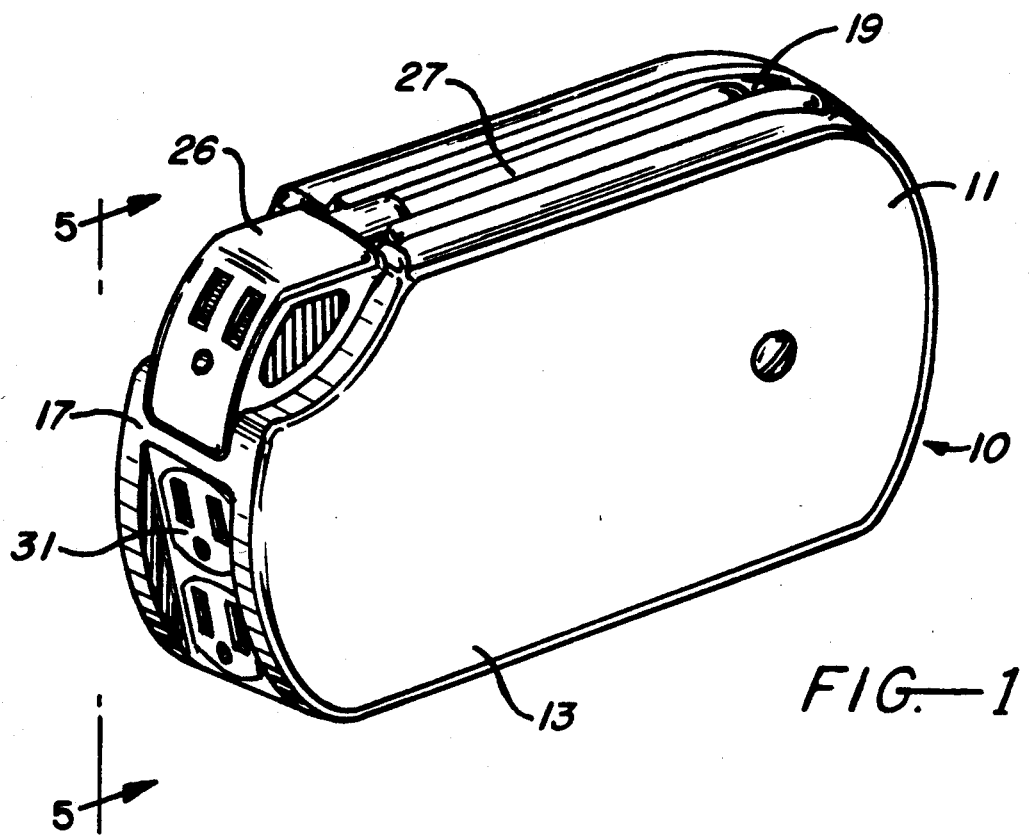
FIG.—1
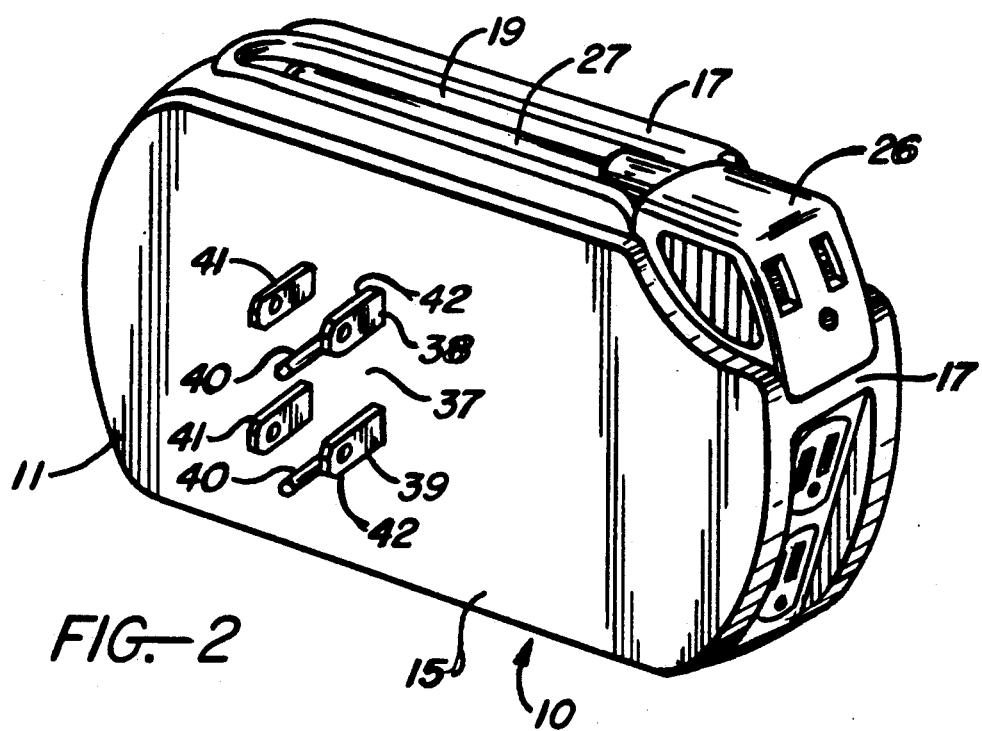
FIG.—2

WALL-MOUNTED ELECTRICAL POWER SUPPLY

BACKGROUND OF THE INVENTION

1. Field of the Invention

The present invention relates to an electrical device engageable in an electrical wall outlet to supply electrical current to an electrical extension cord wound on a reel located within the device, the real being rotatable for extension of the cord to be pulled from the device to supply current to electrical appliances remote from the wall outlet.

2. Prior Developments

Various devices of the prior art involve housing extension cords on rotary reels, whereby the extension cords can be pulled out of the housing to supply electrical power to remotely-located appliances. U.S. Pat. No. 2,979,576, to Huber discloses an electrical power supply device comprising a portable housing with electrical prongs insertable into an electrical wall outlet, whereby the housing is mountable on a room wall. The electrical prongs have internal electrical brush means engageable with a circular track on the periphery of a rotary reel structure within the housing. An extension cord is wound on the reel so that the cord can be drawn from the housing to supply electrical power to an appliance plugged onto the free end of the cord.

U.S. Pat. No. 3,056,863 to Johnson discloses an electrical power supply device in many respects similar to the device of the above-noted U.S. Pat. Nos. 2,979,576. However, the Johnson device avoids the use of electrical brush means for supplying current to the extension cord. In the Johnson device, the extension cord has an electrical prong construction on the central axis of the reel housing, so that the housing can be rotated to draw the extension cord from a stationary reel.

U.S. Pat. No. 4,114,736 to Scherenberg discloses an electrical power supply device wherein a reel housing is mounted on a room wall remote from a wall outlet. A flexible electrical cord extends from the wall outlet to the housing to supply power to an extension cord wound on a rotary reel within the housing. Two annular electrical tracks on the reel receive current from electrical brushes carried by the reel housing, thus to supply electrical power to the extension cord in any rotated position of the reel. A principal feature of the Scherenberg device is a releasable retention means for automatically retaining the reel in selected positions of cord extension from the reel housing.

U.S. Pat. No. 4,725,697 to Kovacik, et al., discloses a portable housing containing a rotary reel structure having two electrical receptacles connected to one end of an extension cord wound on the reel, with an electrical plug attached to the cord in an external location. The plug can be plugged into a wall outlet, and the housing moved to a remote location where its electrical receptacles may be used for supplying power to electrical appliances. During movement of the housing the extension cord unwinds from the reel to maintain an electrical connection between the wall outlet and the electrical receptacles on the reel.

SUMMARY OF THE INVENTION

The present invention relates to an electrical power supply device having a housing with electrical prong means for mounting the housing directly on a wall outlet. A rotary reel within the housing supports an extension cord in a wound condition. An electrical socket means is carried on the free end of the extension cord, whereby the cord may be pulled out of the housing to dispose the socket means at selected distances and locations relative to the housing. The electrical prong means comprises two sets of prongs adapted for insertion into a double wall outlet, thus to secure the housing to the room wall with minimum stress on individual ones of the prongs.

The housing is of sufficient size to conceal the double wall outlet. Therefore, neither of the female receptacles in the wall outlet can be electrically used while the housing is positioned on the room wall. However, the housing has therein an auxiliary electrical receptacle. Electrical connections are provided in the housing for supplying electrical power to the extension cord and to the auxiliary electrical receptacle in the housing.

The arrangement according to the invention enables a householder or other person to plug one appliance into the socket structure on the free end of the extension cord, and to plug a second appliance into the auxiliary receptacle in the wall-mounted housing. Thus, the extension cord can be effectively used to power an appliance remote from the wall outlet without loss of the use and function of the wall outlet. The auxiliary electrical receptacle can serve as the wall outlet.

BRIEF DESCRIPTION OF THE DRAWINGS

FIG. 1 is a front perspective view of an electrical supply device according to the present invention;

FIG. 2 is a rear perspective view of the device of FIG. 1;

DESCRIPTION OF A PREFERRED EMBODIMENT OF THE INVENTION

Figure 3:
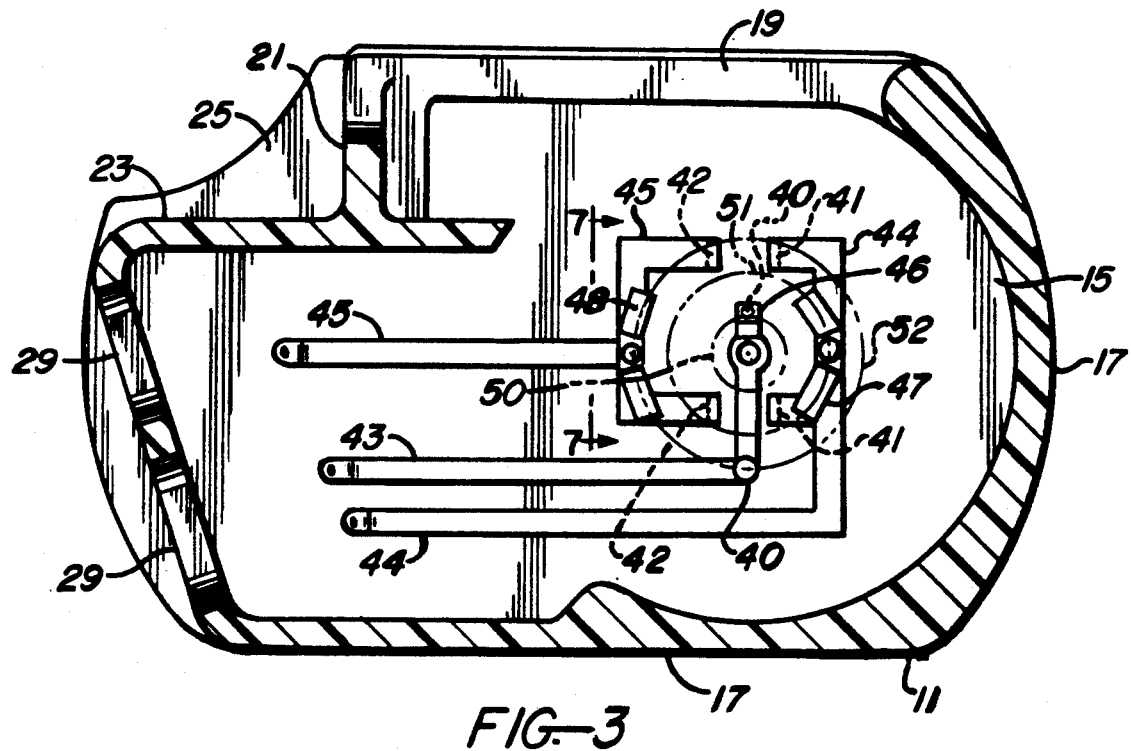
FIG. 3 is a sectional view taken on line 3—3 in FIG. 5, with some internal features omitted to show interior details.
Figure 6:
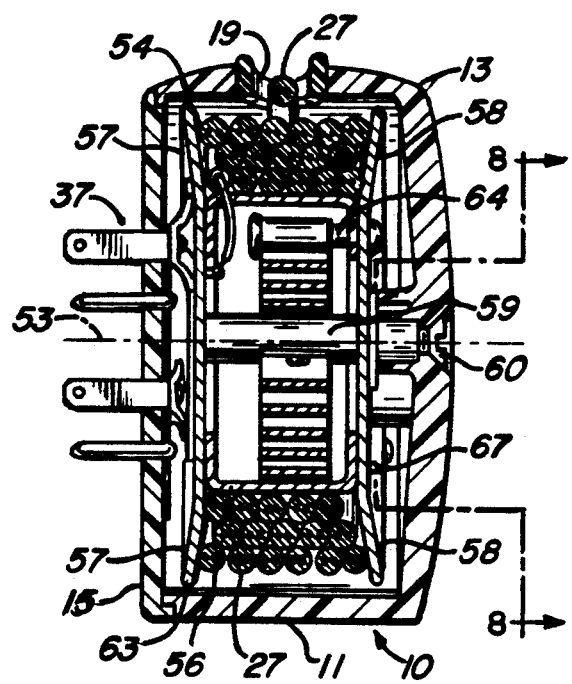
FIG. 6 is a transverse sectional view taken on line 6—6 in FIG. 4.

Referring to the drawings, there is shown an electrical power supply device 10 including a housing 11 having a front wall 13, a rear wall 15, and a peripheral wall 17 joining the front and rear walls. As best shown in FIGS. 3 and 6, peripheral wall 17 is cut away along its upper section to define a slot-like opening 19. Wall 17 comprises a short vertical wall section 21 (FIG. 3) and a connection horizontal wall section 23 inset from the associated edge areas of the housing front and rear walls to form an external pocket 25 to accommodate an electrical socket 26 attached to the free end of an extension cord 27.

Figure 4:
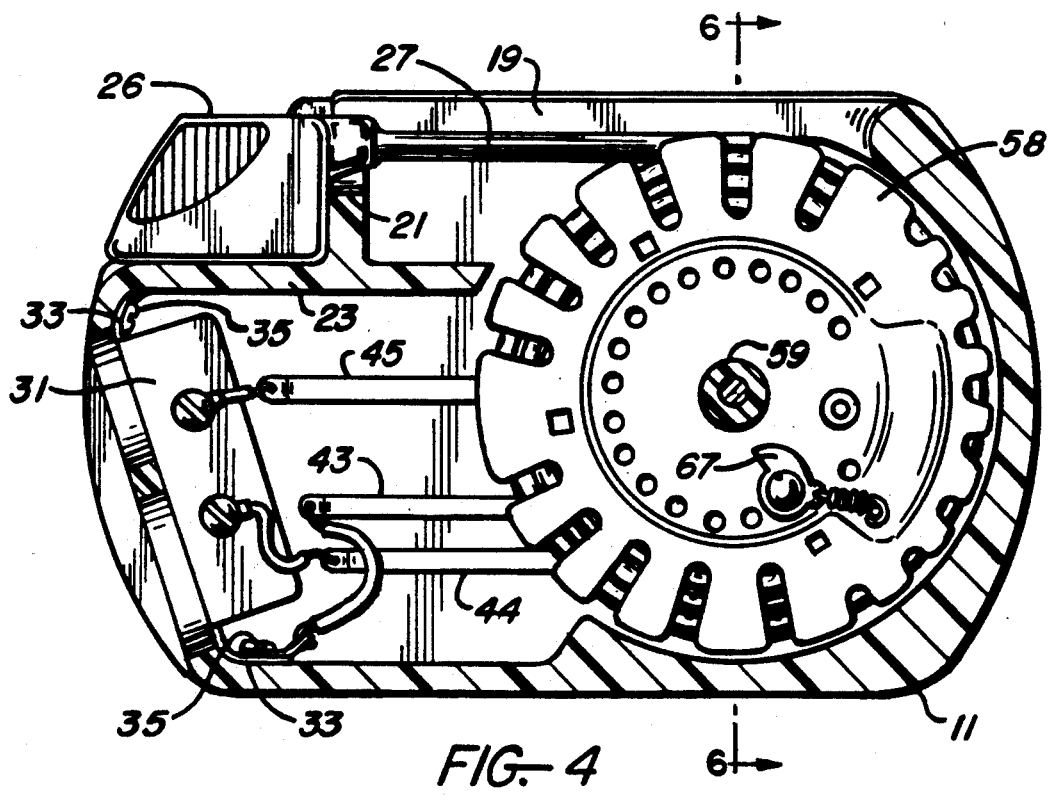
FIG. 4 is a sectional view taken on line 4—4 in FIG. 5.
Figure 5:
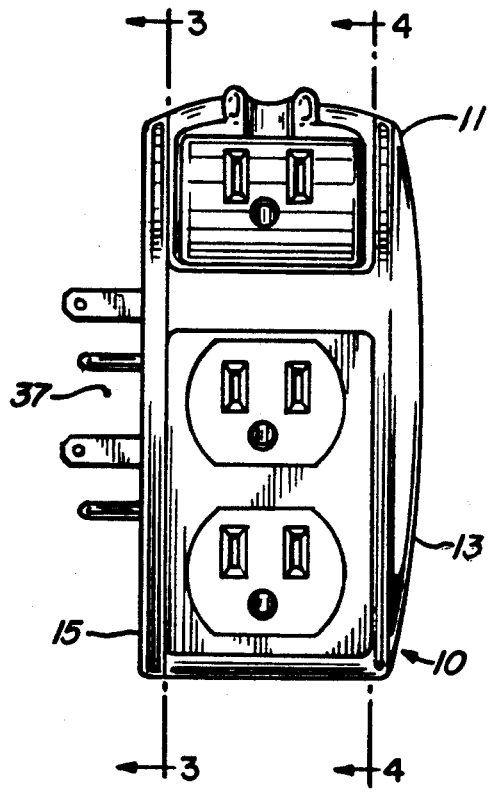
FIG. 5 is an end view of the electrical supply device of FIG. 1, taken in the direction of arrows 5—5 in FIG. 1.

The left side of peripheral wall 17 has two openings 29 (FIG. 3) which provide access to an electrical receptacle 31 (FIG. 4). The receptacle has tabs 33 for receiving mounting screws 35, to mount receptacle within the housing.

Housing 11 may be formed in various ways. In FIG. 6, the housing is shown as formed of two plastic sections which snap together to provide the housing configuration. Front wall 13 is integrally joined to peripheral wall 17 to provide one housing section, and rear wall 15 forms the other housing section. Edge areas of the two housing sections are suitably configured to be snap-fitted together.

Electrical prong means 37 is mounted on housing rear wall 15 to deliver electrical power to the extension cord 27 and electrical receptacle 31. As best seen in FIG. 2, the electrical prong means comprise an upper set of prongs 38 and a lower set of prongs designated 39. Each set of prongs comprises three prongs conventionally spaced for mounting housing 11 on a room wall by plugging the prong means into a conventional double wall outlet (not shown).

The ground prong in each set of prongs is identified by numeral 40, and the other two prongs are identified, respectively, by numerals 41 and 42. FIG. 3 is a view from within the housing 11 at a system of electrical connector strips mounted on housing 15 and electrically connected with the various external prongs 40, 41 and 42. Prongs 40 in the two sets of prongs are connected to a connector strip 43, and prongs 41 are connected to a second connector strip 44. Prongs 42 in the two sets of prongs are connected to a third connector strip 45. As shown in FIG. 4, flexible lead wires are extended from terminals on receptacle 31 to the ends of connector strips 43, 44 and 45, whereby the connector strips form electrical connections between the various prongs 40, 41 and 42 and the electrical receptacle. When the prongs means 37 is plugged into a double wall outlet, the electrical receptacle functions as a substitute for the wall outlet, the wall outlet being then covered by housing 11 and thus not being accessible.

Figure 7:
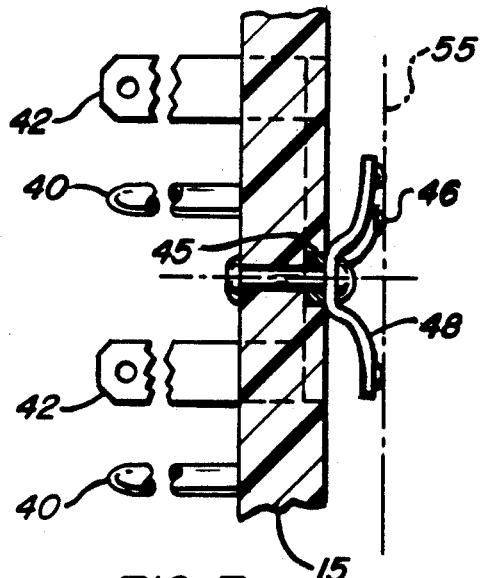
FIG. 7 is a fragmentary sectional view taken on line 7—7 in FIG. 3.
Figure 10:
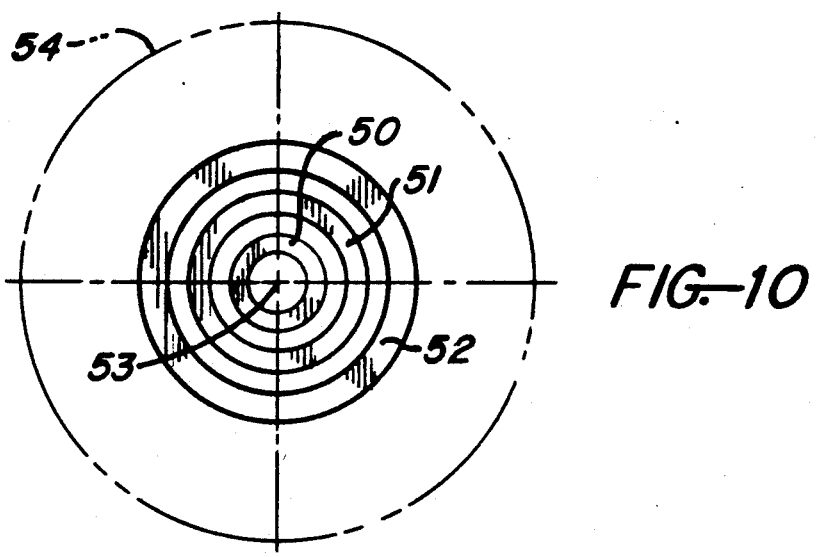
FIG. 10 is a fragmentary view taken in the direction opposite that of the view of FIG. 3.

Each of connector strips 43, 44, 45 carries a resilient electrical contactor 46, 47, or 48. As shown in FIG. 7, a representative contactor 48 comprises two duplicative spring arms riveted to the associated connector strip 45 and extending away from the inner surface of housing wall 15. The various resilient contactors have their free ends spaced different distances from the rotational axis of a rotary reel which supports the extension cord 27 in a wound-up condition in housing 11. Concentric annular electrical tracks on a side surface of the reel are oriented to ride on the free ends of the contactor arms 46, 47 and 48, whereby electrical power is delivered to the extension cord. In FIG. 3 the three concentric annular tracks on the reel are indicated at 50, 51 and 52; FIG. 10 shows these three tracks as three concentric annular bands. The reel rotational axis is indicated at 53, and the peripheral edge of the reel side wall is indicated at 54. In FIG. 7, the general plane of the annular tracks is indicated at 55.

Figure 11:
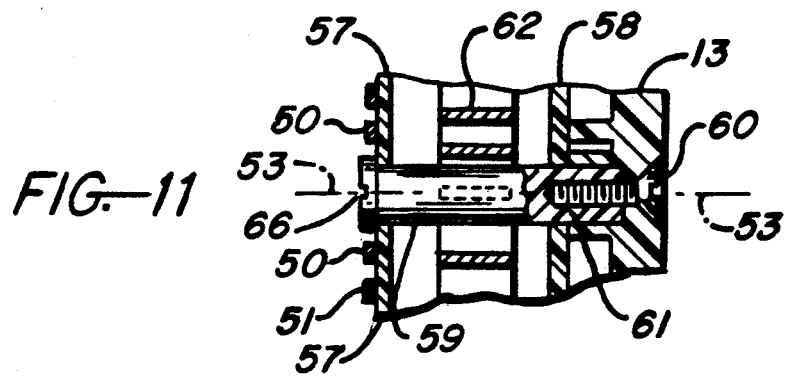
FIG. 11 is a fragmentary sectional view taken in the direction of FIG. 6, illustrating structural features not fully shown in FIG. 6.

FIGS. 6 and 11 show the general construction of the cord-supporting reel, which comprises an annular tubular wall 56 extending between two side walls 57, 58 to define a cord-accommodating space on the outer surface of the tubular wall. The cord is wound about tubular wall 56 a multiplicity of turns to provide sufficient cord length. The innermost ends of the three wires in the cord 27 have hardwire connections with respective ones of the tracks 50, 51, 52.

FIG. 11 shows a mechanism for rotatably mounting the reel 63 in housing 11. A circular shaft 59 extends through circular openings in reel side walls 57 and 58 and into a socket 61 in housing wall 13. A screw 60 is threaded into a threaded opening in shaft 59 to clamp the shaft in a fixed position in the housing. Shaft 59 rotatably supports the reel in housing 11. When a manual pulling force is exerted on the external socket means 26 (FIG. 4), the reel is rotated to permit extension of cord 27 from the housing. During this operation the housing remains attached to the double wall outlet on the room wall.

A spring mechanism is provided for returning the extension cord back into housing 11. As shown in FIG. 6, this spring mechanism comprises a spiral leaf spring 62 having one end attached to shaft 59 and the other end attached to the reel by a pin 64. During assembly of the illustrated device, the spiral leaf spring is assembled into the reel prior to insertion of the reel into housing 11. Prior to final tightening of screw 60, shaft 59 is turned in socket 61 to provide a desired tension in spring 62, a screw driver slot 66 in the left end of shaft 59 being provided for this purpose.

Figure 9:
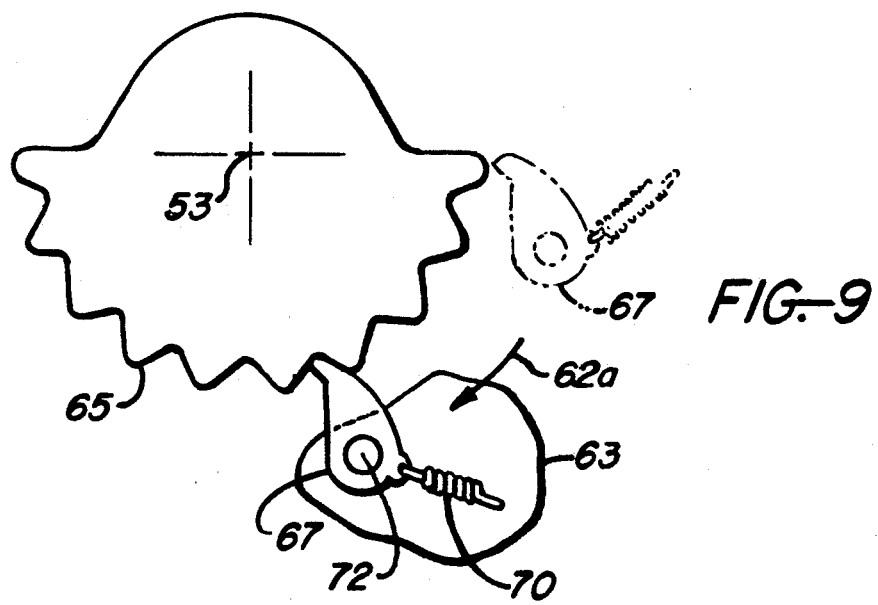
FIG. 9 is a diagrammatic view taken in essentially the direction of the view of FIG. 8, illustrating the action of a pawl-ratchet mechanism that may be utilized to retain the extension cord in selected positions of adjustment.

In order to releasably retain extension cord 27 in selected positions of extension from housing 11, any appropriate releasable latch mechanism may be utilized. The latch mechanism shown in the drawings comprises a stationary tooth structure 65 molded integrally with housing front wall 13. A cooperating pawl 67 is pivotably carried on the reel side wall 58. FIG. 9 diagrammatically illustrates the action of the pawl on the stationary tooth structure.

In FIG. 9 pawl 67 is shown in full lines engaged with the stationary teeth to retain the reel in a selected fixed position against the biasing action of the leaf spring 62, the direction of action of spring 62 being indicated by arrow 62A. The tension spring 70 is extended on a line extending through the pivot axis 72 of pawl 67, whereby the pawl is held in its full line position to prevent motion of reel 63 about reel axis 53.

The reel is manually movable in a counterclockwise direction, during which action the pawl trips over the stationary teeth 65. The reel will be latched when the pawl comes to rest between any two teeth 65.

The pawl is shown in broken lines during return motion of the reel by the action of spring 62. As the tip of the pawl strikes the stationary dog 73 the pawl is deflected to pass over the dog into the toothed area 65. The reel can be stopped by manual restraining force on the extension cord, the pawl slowing to a point where it can assume the latched position shown in full lines. Without the manual restraining force, the reel will continue to rotate in a counterclockwise direction until the extension cord is in the fully retracted condition of FIG. 4.

Figure 8:
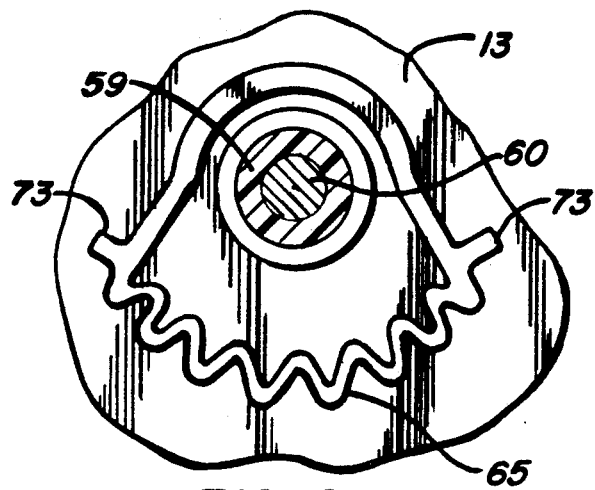
FIG. 8 is a fragmentary view taken on line 8—8 in FIG. 6.

The reel latching mechanism of FIGS. 4, 8 and 9 is representative of various latching mechanisms that can be used in practical embodiments of the invention.

The invention is concerned with the arrangement of receptacle 31 and the reel-cord assembly, whereby it is possible to supply electrical power to an electrical appliance remote from housing 11, while at the same time supplying power to a different appliance plugged into receptacle 31. The term "appliance" here refers to any conventional household device requiring electrical power, e.g., a lamp, hairdryer, heating pad, radio, television set, electric razor, etc.

It would be possible to mount the device on a wall outlet using only one set of electric prongs, e.g., prongs 38 or 39. However, by using two sets of prongs the housing has a more stable mounting, such that extension or retraction of the cord 27 into or out of the housing is less likely to upset and loosen the housing from the outlet.

The power supply device is so designed that the reel rotation axis 53 extends parallel to the various prongs 40, 41 and 42. Therefore, forces associated with rotation of reel 63 are less likely to cause the housing 11 to pull away from the room wall. For a similar reason, receptacle 31 is so oriented as to be accessible through peripheral wall 17 rather than through front wall 13. The force of the pronged connector on the appliance acts normal to the prong means 37 so that the appliance may be plugged into receptacle 31 or removed from the receptacle without disturbing housing 11.

Thus there has been shown and described a novel wall-mounted electrical power supply which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:
1. An electrical supply device, comprising:
   a housing,
   a reel rotatably supported in said housing,
   an extension cord wound on said reel,
   electrical socket means on one end of said extension cord, whereby the cord may be pulled from the housing to dispose the socket means at selected locations,
   an electrical receptacle mounted in said housing and having externally accessible socket openings therein,
   electrical prongs extending from the housing for mounting the housing on a wall outlet, and
   means for electrically connecting the prong means to said extension cord and to said electrical receptacle so that the extension cord and receptacle are electrically parallel.
2. An electrical supply device according to claim 1, wherein said electrical connecting means comprises:
   annular track means carried by the reel, and
   resilient electrical contact means carried by the housing for slidable engagement with said track means, whereby electrical power is delivered to said track means in any rotational position of the reel.
3. An electrical supply device according to claim 1, wherein said electrical prong means comprise two sets of prongs insertable into a double wall outlet.
4. An electrical supply device according to claim 3, wherein:
   each set of prongs comprises three prongs,
   said electrical connecting means comprises three separate connector strips extending along an inner surface of said housing so that each connector strip electrically engages one prong of each set of prongs.
5. An electrical supply device according to claim 4, wherein said electrical connecting means comprises:
   three concentric annular tracks carried by the reel, and
   three resilient electrical contacts extending from respective ones of said connector strips for slidable engagement with respective ones of the annular tracks, whereby electrical power is delivered to the tracks in any rotational position of the reel.
6. An electrical supply device according to claim 5, and further comprising:
   a cylindrical shaft mounted within said housing and coaxial with the concentric annular tracks, said reel having two side walls defining aligned circular holes fitting about said shaft, whereby the reel is rotatably supported within the housing.
7. An electrical supply device according to claim 6, and further comprising:
   a spiral leaf spring within said reel for biasing the reel toward a position wherein the extension cord is fully wound on the reel, said spiral leaf spring having one end thereof connected to the shaft and the other end thereof connected to the reel.
8. An electrical supply device comprising:
   a housing having a front wall, a rear wall, and a peripheral wall joining said front and rear walls,
   electrical prong means extending from said housing rear wall for insertion into electrical sockets in a wall outlet, whereby the housing can be detachably mounted on a building wall,
   a reel rotatably mounted within said housing for rotation about a central axis parallel to said electrical prong means,
   an electrical extension cord wound on said reel, said extension cord having electrical socket means located externally of the housing, whereby said cord may be drawn out of the housing to relocate the socket means at locations at selected distances from said housing,
   an electrical receptacle mounted within said housing adjacent the reel so that socket openings in the receptacle are externally accessible for supplying current to electrical appliances,
   electrical connector means extending between said electrical prong means and said receptacle to deliver electrical power to the receptacle socket openings,
   electrical contact means extending from said prong means within said housing, and
   annular electrical track means carried by said reel for slidable engagement with said contact means, whereby electrical power is delivered to said electrical track means in any position of rotation of the reel, said extension cord having therein electrical connections to said electrical track means for supplying current to electrical appliances plugged into said socket means.

* * * * *